S. JOHNSON.
ODOMETER.

No. 181,579. Patented Aug. 29, 1876.

Witnesses:
H. E. Haddan
N. Onslow Wood

Inventor:
Sidney Johnson.

UNITED STATES PATENT OFFICE.

SIDNEY JOHNSON, OF LONDON, ENGLAND.

IMPROVEMENT IN ODOMETERS.

Specification forming part of Letters Patent No. 181,579, dated August 29, 1876; application filed March 30, 1876.

*To all whom it may concern:*

Be it known that I, SIDNEY JOHNSON, of 67 Strand, in the city of London and county of Middlesex, Kingdom of Great Britain, have invented a new and useful Improvement in Machinery for Indicating the Distance Traveled by Vehicles, which improvement is fully set forth in the following specification, reference being had to the accompanying drawings.

My invention consists in giving motion to any suitable distance-indicating apparatus fixed on the wheel of any vehicle, as and when such wheel revolves, by means of a ball allowed to travel freely, by gravity, in a closed annular chamber, and made to impinge at every revolution of such wheel on the blade or blades of a driving-wheel situated partly within said annular chamber, mounted on a toothed pinion, and, when desired, with a ratchet and pawl to prevent back movement, and driving any indicating and registering machinery, properly proportioned to the wheel of the vehicle, and to the movement and registration which it may be desired to indicate.

The accompanying drawings will show how my improvements may be readily performed.

Figure 1:
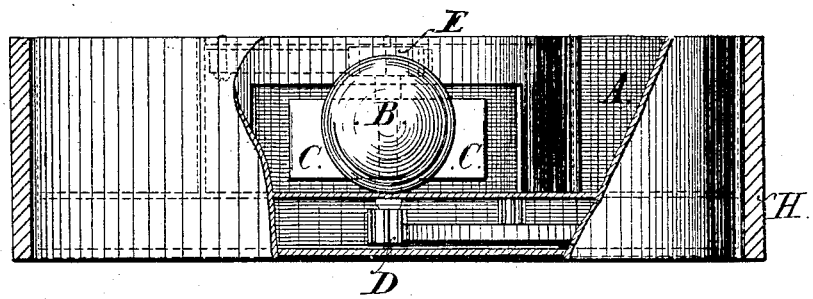
Figure 2:
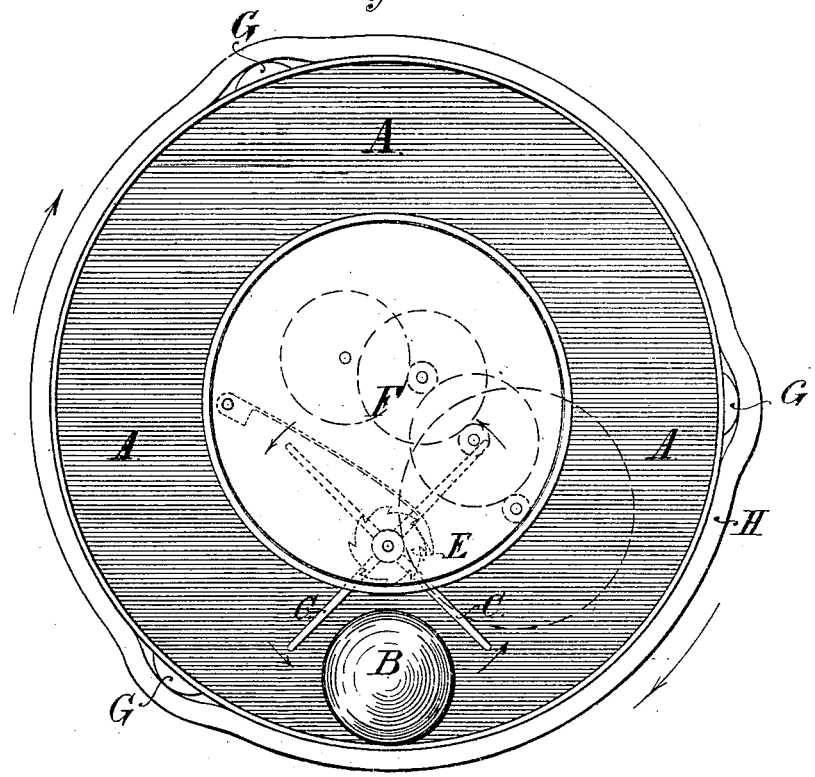

Figure 1 is a sectional side elevation, and Fig. 2 a plan view.

In said views, A is the annular chamber; B, the ball; C, the bladed driving-wheel; D, pinion of same; E, ratchet and pawl to prevent backward movement of C; F, an inner chamber, in which the indicating and registering apparatus (which may be of any ordinary description suitable for the purposes intended) may be placed; G, studs impinging on a rubber band, H, or; in lieu of a band, a rubber tube may be conveniently used, which is introduced as a packing to diminish concussion, and placed between the outer side of the annular chamber A and a ring, clip, or band, this latter ring being fixed direct to the wheel of the vehicle, or on the axle thereof.

I claim as my invention—

The combination, in machinery for indicating the distance traveled by vehicles, of the annular chamber A, the ball B, working by gravity therein, the bladed driving-wheel C, and the rubber band or tube H, all substantially as and for the purposes described and set forth.

SIDNEY JOHNSON.

Witnesses:
 H. I. HADDAN,
 W. ONSLOW WOOD.